United States Patent [19]
Libkin

[11] Patent Number: 5,628,012
[45] Date of Patent: May 6, 1997

[54] METHOD AND APPARATUS FOR QUERYING A DATABASE CONTAINING DISJUNCTIVE INFORMATION

[75] Inventor: Leonid Libkin, Basking Ridge, N.J.

[73] Assignee: Lucent Technologies Inc., Murray Hill, N.J.

[21] Appl. No.: 441,903

[22] Filed: May 16, 1995

[51] Int. Cl.$^6$ .................................................. G06F 17/30
[52] U.S. Cl. .......................................... 395/613; 395/603
[58] Field of Search ..................................... 395/613, 603

[56] References Cited

PUBLICATIONS

Ola, "Relational Databases with Exclusive Disjunctions", Eighth International Conferences on Data Engineering, 2–3 Feb. 1992, pp. 328–336.

*Primary Examiner*—Wayne Amsbury
*Attorney, Agent, or Firm*—Jeffrey M. Weinick

[57] ABSTRACT

A method and apparatus for querying a disjunctive database is disclosed. An annotated object, which defines a complete object which is a unique element of the normal form of the database, is stored and maintained in memory. A complete object is created using the annotated object, and is stored in memory. A query is run against the complete object. If continued processing is required, a next function produces a next annotated object, which represents another unique element of the normal form of the database. The next annotated object is stored in memory, overwriting the previous annotated object. A complete object is then created using the next annotated object and is stored in memory, overwriting the previous complete object. The query is then applied to the complete object stored in memory. By processing the elements of the normal form one at a time and reusing memory spaces, the present invention has a polynomial space requirement. The invention also allows processing to begin from a pre-defined annotated object, either user defined or random. A user defined annotated object may define certain sub-objects which are not to be processed. Further, processing may terminate with the last processed, annotated object as an output.

25 Claims, 16 Drawing Sheets

FIG. 10

```
I1    initial x = (B,x) if x is of base type.
I2    initial (x,y) = (P, true, (initial x, initial y)).
I3    initial {x_1,...,x_n} = (S, true, [initial x_1,...,initial x_n]).
I4    initial <x_1,...,x_n> = (O, true, [initial x_1, true),
      (initial x_2, false),...,(initial x_n, false)]).
I5    initial <> = (O, false, []).
```

FIG. 11

```
P1    pick (B,x) = x.
P2    pick (P, c(x,y)) = if c then (pick x, pick y) else void.
P3    pick (S, c, [x_1,...,x_n]) = if c then (pick x_1,..., pick x_n) else void.
P4    pick (O, c [x_1,...,x_n]) = if c then pick π_1 (x_i)
      else void where π_2(x_i) = true.
P5    pick (O, c, []) = void.
```

FIG. 12

$$\text{BASE}$$
$$\overline{\text{next}(B, x) = (B, x)}$$

$$\text{PAIR}$$

$$\frac{\neg\text{end}(\text{next } y)}{\text{next}(P, c, (x, y)) = (P, \text{true}, (x, \text{next } y))} \qquad \frac{\text{end}(\text{next } y) \quad \text{end}(\text{next } x)}{\text{next}(P, c, (x, y)) = (P, \text{false}, (x, y))}$$

$$\frac{\text{end}(\text{next } y) \quad \neg\text{end}(\text{next } x)}{\text{next}(P, c, (x, y)) = (P, \text{true}, (\text{next } x, \text{reset } y))}$$

$$\text{SET}$$

$$\frac{}{\text{next}(S, c, []) = (S, \text{false}, [])} \qquad \frac{\neg\text{end}(\text{next } x_1)}{\text{next}(S, c, X) = (S, \text{true}, \text{next } x_1 :: [x_2, \ldots, x_n])}$$

$$\frac{\text{end}(\text{next } x_1) \quad \text{next}(S, \text{true}, [x_2, \ldots, x_n]) = (S, c', X')}{\text{next}(S, c, X) = (S, c', \text{reset } x_1 :: X')}$$

$$\text{OR-SET}$$

$$\frac{}{\text{next}(O, c, []) = (O, \text{false}, [])} \qquad \frac{\pi_2(x_i) \quad X_{1i} = [] \quad \text{end}(\text{next } \pi_1(x_i))}{\text{next}(O, c, X) = (O, \text{false}, X)}$$

$$\frac{\pi_2(x_i) \quad X_{1i} \neq [] \quad \text{end}(\text{next } \pi_1(x_i))}{\text{next}(O, c, X) = (O, \text{true}, X_{0i} \circ [(\pi_1(x_i), \text{false}), (\pi_1(x_{i+1}), \text{true})] \circ [x_{i+2}, \ldots, x_n])}$$

$$\frac{\pi_2(x_i) \quad \neg\text{end}(\text{next } \pi_1(x_i))}{\text{next}(O, c, X) = (O, \text{true}, X_{0i} \circ [(\text{next } \pi_1(x_i), \text{true})] \circ X_{1i})}$$

METHOD AND APPARATUS FOR QUERYING A DATABASE CONTAINING DISJUNCTIVE INFORMATION

FIELD OF THE INVENTION

The present invention relates generally to database querying. More particularly, the invention relates to querying a database which contains disjunctive information.

BACKGROUND OF THE INVENTION

Information stored in databases is often incomplete. For certain database objects whose values are not presently known to the database, possible values may be stored as disjunctive information which represents two or more alternative values. For example, if the value of an age attribute were not known, the possible values of the attribute e.g. <29, 30, 31> could be stored. Disjunctive information often arises in design and planning databases, which are discussed in T. Imielinski, S. Naqvi, and K. Vadaparty, "Incomplete Objects-A Data Model For Design And Planning Applications," in *SIGMOD*-91, pages 288–297; and T. Imielinski, S. Naqvi, and K. Vadaparty, "Querying Design And Planning Databases," in *LNCS* 566: *DOOD*-91, pages 524–545, Springer-Verlag. Disjunctive information in a database may also arise due to conflicts that occur when different databases, containing conflicting information, are merged. Choosing one possibility for each instance of disjunctive information gives a possible world described by an incomplete database.

Two types of queries on disjunctive databases have been employed. A structural query asks questions about the data stored in a database. Conceptual queries ask questions about the possible complete objects represented by a database. These two types of queries may be described by way of example. Consider a design template used by an engineer. The template may indicate that the design of some item D consists of both component A and component B, where component A can be either an x or a y. This example disjunctive database represents two complete objects. The first complete object represents the design of D consisting of x and B. The second complete object represents the design of D consisting of y and B. A structural query would ask about the configuration of the database, for example "what are the choices for component A." A conceptual query would ask about possible completed designs, for example, "how many completed designs are there". Most typically, conceptual queries are existential queries, which ask about the existence of a complete object with some quality, or optimization queries, which ask about the complete object which has some parameter optimized. An example of an existential query is, "is there a completed design that costs under $100 and has reliability at least a 95%". An example of an optimization query is "what is the most reliable design".

A mechanism for querying a database which contains disjunctive information is called normalization. A normalized database is a collection of all possible complete objects represented by a disjunctive database. The collection of elements in the normalized database is called the normal form of the database. For example, in the example above, the normal form of the database contains two elements. The first element of the normal form is the complete object representing the design of D which consists of x and B. The second element of the normal form is the complete object representing the design of D which consists of y and B. Once the normal form of a disjunctive database is produced, a conceptual query on the database can be processed by applying the query to each element of the normal form.

An algorithm to compute the normal form of a database is described in L. Libkin and L. Wong, "Semantic Representations and Query Languages for Or-Sets", in *PODS*-93, pages 37–48. The algorithm presented in that paper requires that the entire normal form be created before any conceptual queries could be asked. Thus, all possible complete objects represented by the disjunctive information in the database, i.e. all elements of the normal form, must be created and stored in memory prior to any queries being run on the database. The problem with this solution is that the normal form of a database may be very large. Roughly, if a database has size n, the size of the normal form of the database is bounded above by $n \times 1.45^n$. Thus, the space required to produce the normal form of a disjunctive database increases exponentially with the size of the database. Due to the space requirement, the answering of conceptual queries using the above method is very expensive and impractical.

SUMMARY OF THE INVENTION

The present invention provides an improved method and apparatus for querying a database containing disjunctive information. Complete objects, which are elements of the normal form of the database, are created and queried one at a time. One advantage of this technique is that it allows each of the complete objects to be stored in one memory space. Thus, in accordance with one aspect of the invention, a first element of the normal form is created, stored in a memory space, and queried. A second element of the normal form is then created, stored in the same memory space as the first element, and queried. As a result of the ability to create these elements of the normal form one at a time, and thus use the same memory space, the invention has a polynomial space requirement instead of the exponential space requirement of prior techniques.

In one embodiment, an object which contains disjunctive information is annotated with type indicia and boolean indicia to create an annotated object. This annotated object is maintained in memory and it defines a unique element of the normal form. A pick function analyzes the annotated object, creates a complete object which is an element of the normal form, and stores the complete object in memory. A next function processes the annotated object to create a next annotated object with updated boolean indicia, which defines a next unique element of the normal form. Thus, in one embodiment, the annotated object is the mechanism which provides for the processing of the elements of the normal form one at a time.

In accordance with other aspects of the invention, the query processing may begin with any user specified annotated object, including a random annotated object. In addition, the query processing may be interrupted and the last annotated object can be an output. These techniques, and combinations of these techniques, provide for various novel query techniques. For example, a long running query process may be interrupted at a particular point so that a user may inspect the intermediate query results. The query processing can continue from the last processed annotated object, some other user defined annotated object, or a random annotated object.

In accordance with yet another aspect of the invention, the user may modify the annotated object so that certain subobjects will not be processed.

These and other advantages of the invention will be apparent to those of ordinary skill in the art by reference to the following detailed description and the accompanying drawings.

BRIEF DESCRIPTION OF THE DRAWINGS

FIG. 10 is a functional language description of the initial function.

FIG. 11 is a functional language description of the pick function.

FIG. 12 is a functional language description of the next function.

DETAILED DESCRIPTION

Figure 1:
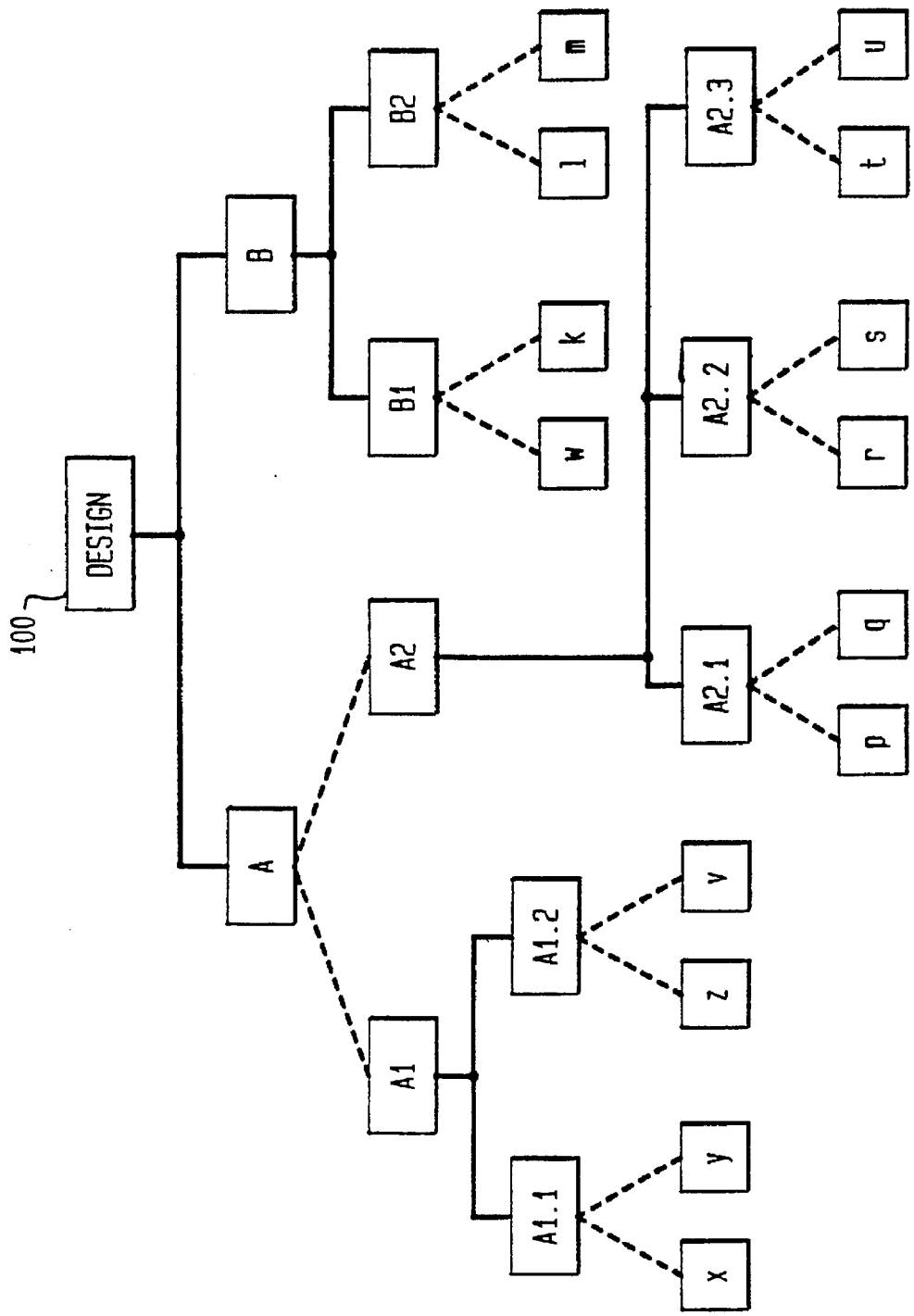
FIG. 1 shows a Design object containing disjunctive information.

Consider the database object DESIGN 100 shown in FIG. 1, which represents an incomplete design. The object 100 consists of sub-objects, which represent parts of the design object 100. The design object 100 shown in FIG. 1 requires two subparts, A and B. An A is either A1 or A2. The dashed lines between A, and A1 and A2 represents that A1 and A2 are possible choices for the element A. Thus, A1 and A2 represent disjunctive information in the database. The part A1 consists of two subparts: A1.1 and A1.2. An A1.1 is either x or y and an A1.2 is either z or v. The part A2 consists of three subparts A2.1, A2.2, and A2.3. An A2.1 is either p or q, an A2.2 is either r or s, and an A2.3 is either t or u. A B consists of B1 and B2. A B1 is either w or k and a B2 is either l or m.

A note about the use of the term object and sub-object. All entities shown in FIG. 1 may be considered objects. The term sub-object only has meaning in relation to some reference object. For example, if referring to entity B it can be called object B and it has sub-objects B1 and B2. However, it is possible to be interested in entity B1 itself, in which case B1 can be referred to as an object instead of a sub-object.

The notation { } is used to denote ordinary sets, and the notation ⟨ ⟩ is used to define or-sets, which are collections of disjunctive information. In the example of FIG. 1, the whole design can be represented as the set {A, B}, while A is an or-set ⟨A1, A2⟩ and B1 is an or-set ⟨w,k⟩.

Figure 2:
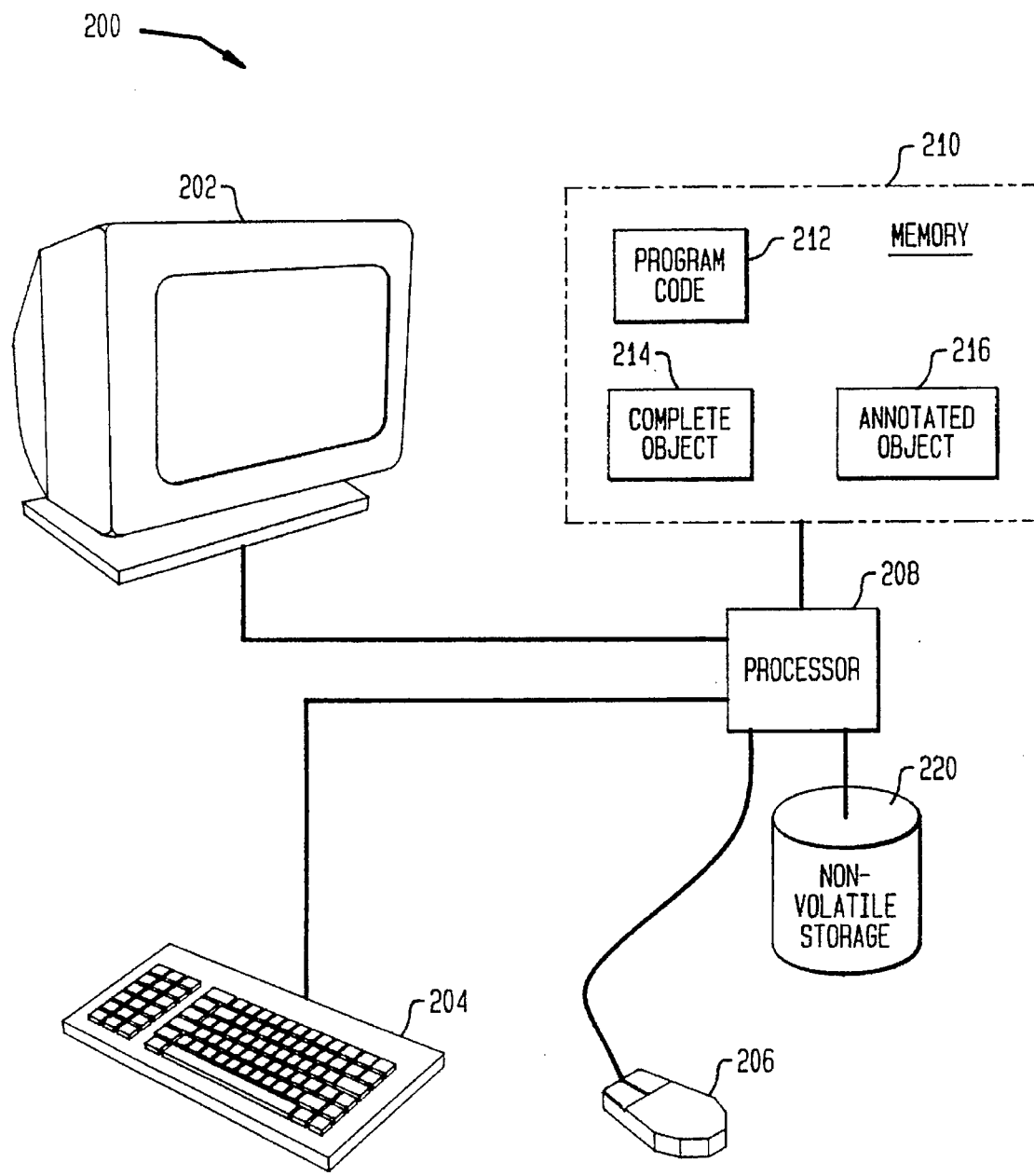
FIG. 2 shows a schematic of the components of a computer system which can be configured to implement the present invention.

As used herein, the term computer includes any device or machine capable of accepting data, applying prescribed processes to the data, and supplying the results of the processes. The functions of the present invention are preferably performed by a programmed digital computer of the type which is well know in the art, an example of which is shown in FIG. 2. FIG. 2 shows a computer system 200 which comprises a display monitor 202, a textual input device such as a computer keyboard 204, a graphical input device such as a mouse 206, a computer processor 208, a memory unit 210, and a non-volatile storage device such as a disk drive 220. The memory unit 210 includes a storage area 212 for the storage of, for example, computer program code, and storage areas 214 and 216 for the storage of data (which will be described in further detail below). The computer processor 208 is connected to the display monitor 202, the memory unit 210, the non-volatile storage device 220, the keyboard 204, and the mouse 206. The external storage device 220 may be used for the storage of data and computer program code. The computer processor 208 executes the computer program code which is stored in storage area 212 in the memory unit 210. During execution, the processor may access data in storage space 214 and 216 in the memory unit 210, and may access data stored in the non-volatile storage device 220. The computer system 200 may suitably be any one of the types which are well known in the art such as a mainframe computer, a minicomputer, a workstation, or a personal computer.

Figure 3:
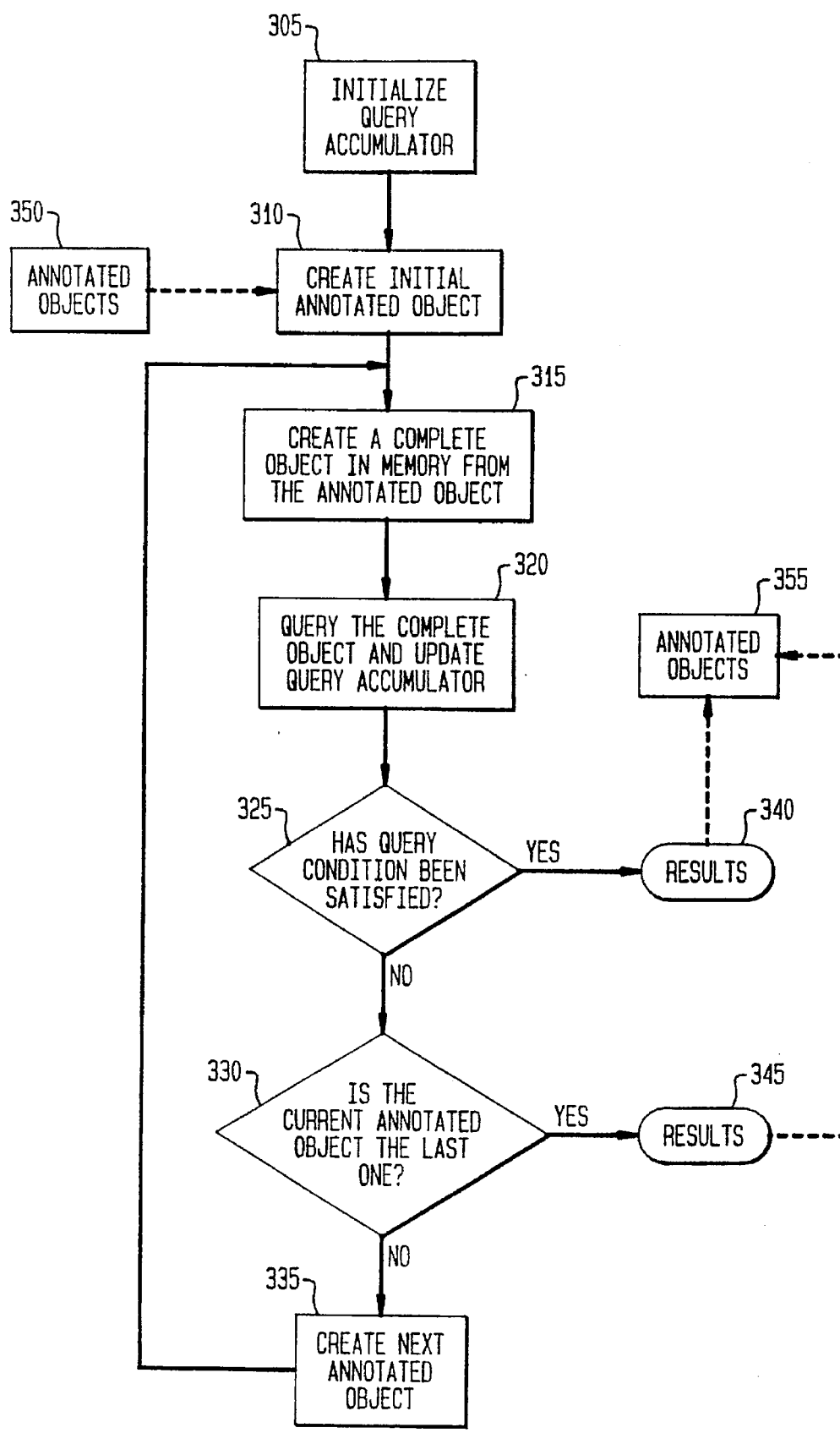
FIG. 3 is a flow diagram of the steps for processing a query against a database containing disjunctive information in accordance with the invention.

The algorithm for processing a query against a database containing disjunctive information in accordance with the present invention is shown in the flow diagram of FIG. 3. The first step 305 is to initialize a query accumulator. This detailed description describes an algorithm which may be used to process various queries against a disjunctive database. The specifics of the query are not important for the purposes of this disclosure. The query accumulator as used herein represents some memory location which stores the results obtained so far during processing. These results will be different depending on the type of query being processed. Regardless of the specifics of the query, some type of accumulator will be used to store the results of the particular query being run.

The next step 310 is to create an initial annotated object. In order to achieve the polynomial space mechanism of the present invention, memory space for storing the complete objects which are elements of the normal form is reused, and each such complete object is processed one at a time. In an advantageous embodiment, this is achieved by maintaining a special structure, called an annotated object, to indicate choices for all instances of disjunctive information in the database. The annotated object consists of the original object which is to be queried, with an annotation added to the object and all sub-objects. In the present description, the design object shown in FIG. 1 is used as an example. Although the DESIGN node 100 is shown as the root node, and the nodes w, k, l, m, x, y, z, v, p, q, r, s, t, and u are shown as leaves, it is to be understood that the present invention is not limited to an object of the type shown. For example, the entire object represented by root node 100 may itself be a sub-object of a larger object. In addition, each of the sub-objects which are at the leaves in FIG. 1, may each represent a further more complex object. However, the object shown in FIG. 1 will be used for illustrative purposes, and one skilled in the art would recognize that the techniques described herein apply to more complex objects.

For purposes of the present invention, 4 types of objects are defined: base, pair, set, and or-set. A base object is one which is not made up of further sub-objects. In FIG. 1, w, k, l, m, x, y, z, v, p, q, r, s, t, and u are base objects. A pair object is one which is made up of exactly two sub-objects, and is represented as (x, y). In FIG. 1, Design and B are pair objects; Design=(A, B) and B=(B1, B2). A set object is an object which is made up of an arbitrary number of subobjects. In FIG. 1, A1[1] and A2 are set objects; A1={A1.1, A1.2} and A2={A2.1, A2.2, A2.3}. An or-set is, as described above, a collection of disjunctive information. In FIG. 1, A, A1.1, A1.2, B1, B2, A2.1, A2.2, and A2.3 are or-sets; A1.1=<A1.1, A1.2>, A1.1=<x, y,>, A1.2=<z v>, B1=<w, k>, B2=<1, m>, A2.1=<p, q>, A2.2=<r, s> and A2.3=<t, u>.

The annotations which are created for these object types are defined as follows:

| Object Type | Annotation |
|---|---|
| Base: | (B) |
| Pair: | (P, bool) |
| Set: | (S, bool) |
| Or-set: | (O,bool, [bool,... bool]) |

[1] In FIG. 1, A1 is shown with only two sub-objects. However, A1 is defined as a set instead of as a pair because all elements of an or-set must, by definition, contain elements of the same type. This is because or-set elements are alternatives, and therefore they must be compatible. Since A2 contains 3 elements, and must be defined as a set, A1 must also be defined as a set. This does not present a problem since a pair is a special form of a set.

The first element of each of the annotations identifies the object's type: B (base), P (pair), S (set), and O (or-set). The element bool represents a boolean value of true or false. The first boolean value shown above in the annotation for the pair, set and or-set type objects, is used to identify whether the object needs to be processed further while creating the elements of the normal form. In other words, the annotation indicates whether the object, or any of its sub-objects, contains disjunctive information which needs to be further considered in creating the elements of the normal form. For base type objects, this boolean value is always assumed to be false, and therefore is not stored in the annotation for base type objects. The use of this boolean value will become clear with reference to the discussion that follows. The or-set annotation contains an additional list of boolean values, shown above as [bool, . . . bool]. These boolean values are used to indicate the element of the or-set that is the current choice given by that or-set. Each boolean value in the boolean list positionally represents one of the elements in the or-set. Only one of these boolean values will contain the value true at any one time. The position of this true value indicates which element is the current choice for the or-set. For example, if the second boolean value in the list is true, then the second element in the or-set is the current choice. To avoid confusion, the boolean elements used to identify whether an object needs further processing while creating the elements of the normal form will be referred to as a boolean annotation. The list of boolean elements contained in the annotation for the or-sets to indicate the element of the or-set which is the current choice will be referred to as a boolean list annotation.

Figure 4A:
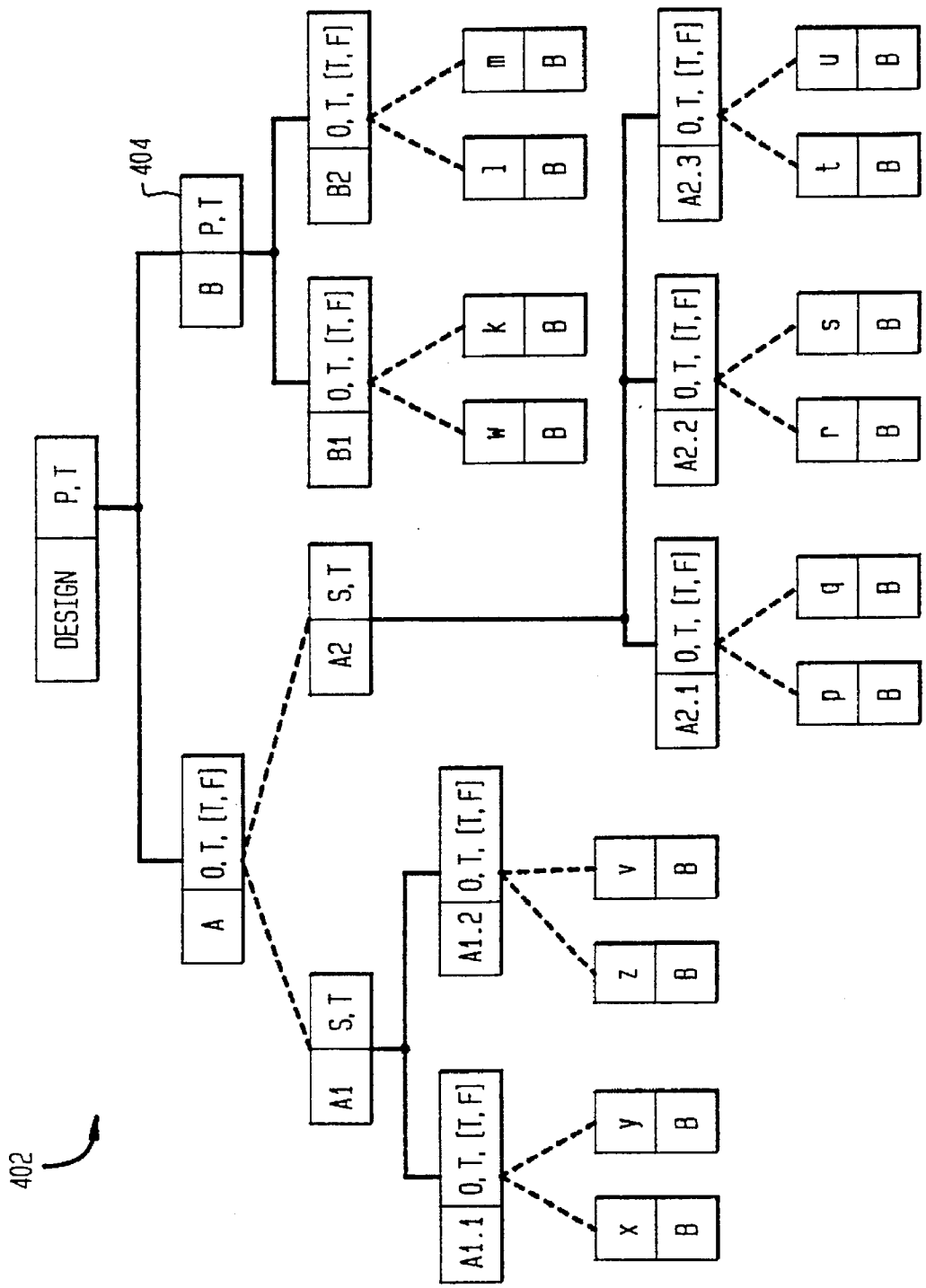
FIG. 4A shows an initial annotated object.

The initial annotated object created in step 310 is shown in FIG. 4A as 402. Each of the objects from FIG. 1 is shown with an associated annotation. The annotation associated with each of the objects is represented in FIGS. 4A and 9A–F by an attachment to the object, e.g. the attachment 404 to object B in FIG. 4A. The initial annotation is created as follows. The base objects, w, k, l, m, x, y, z, v, p, q, r, s, t, and u are annotated with their type B. The pair objects, Design and B, are annotated with their type P and the boolean annotation set to T (true). The set objects, A1 and A2, are annotated with their type S and the boolean annotation set to T. The or-set objects, A, A1.1, A1.2, B1, B2, A2.1, A2.2, and A2.3 are annotated with their type O and the boolean annotation set to T. As described above, the or-set annotation also contains a boolean list annotation [bool, . . . bool]. Initially, the first boolean value in the list is set to T, with all remaining boolean values set to F. This indicates that initially, the first element of the or-set will be chosen for the completed object. Thus, for objects of type pair, set, and or-set, the boolean annotation is initially set to T to indicate that the object requires additional processing to create elements of the normal form. For or-set objects the boolean list annotation is set to contain a T in the first position and an F in all other positions to indicate that the first element in the or-set is the initial chosen element. The initial annotated object 402 is stored in memory unit 210 in memory space 216.

In step 315, a complete object, which is an element of the normal form, is created in memory space 214 using the annotated object stored in memory space 216. A pick function is used to create the element of the normal form from the current annotated object. The pick function operates as follows for each of the object types:

| Type | Operation |
|---|---|
| Base: | pick the element itself |
| Pair: | pick each element of the pair to create a pair |
| Set: | pick each element of the set to create a set |
| Or-set: | pick the element of the or-set which corresponds to a true value in the annotation's boolean list |

Figure 4B:
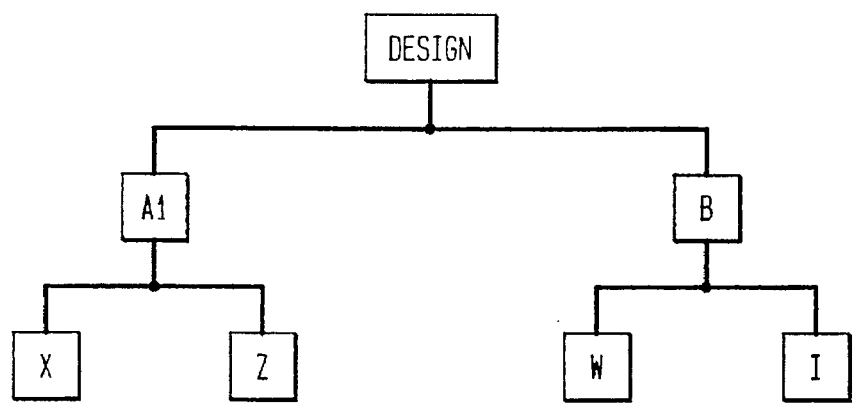
FIG. 4B shows the element of the normal form created from the initial annotation of FIG. 4A.

The element of the normal form which will be created from the initial annotation is shown in FIG. 4B. The Design object is a pair and each element of the pair, A and B, are picked to create a pair in the complete object. Since A is an or-set object, it will contain the element which corresponds to a true value in A's boolean list annotation. The boolean list annotation of object A is [T,F]. Thus, the first element, A1, of the or-set will be chosen for the current complete object. A1 is a set, and each element, A1.1 and A1.2, are picked to create a set. Since A1.1 and A1.2 are or-sets, the elements chosen for A1.1 and A1.2 are determined from their boolean list annotations. Thus, x is chosen for A1.1 and z is chosen for A1.2. In a similar manner, the object B is a set containing objects B1 and B2. Since B1 and B2 are or-sets, the values for B1 and B2 are determined from their boolean list annotations. Thus, w is chosen for B1 and l is chosen for B2. The complete object, which is the element of the normal form defined by the initial annotated object shown in FIG. 4A, is shown in FIG. 4B. This is one complete object of the normal form which is represented by the Design object.

The next step, 320, is to query the complete object which is an element of the normal form and update the query accumulator. The complete object created by the pick function is stored in memory space 214, and a query is applied to that object in a conventional manner. For example, assume the complete object represents a complete design, and also assume that each sub-object contains information about the cost of that sub-object. Then a query on the complete object may take the sum of the costs of each sub-object to calculate the cost of the complete design. Numerous other conventional query techniques which are well known in the art may be applied to the complete object, and will not be described further herein. Various new query techniques which are made possible by the present invention will be described below.

In step 325 a query condition is checked. The query condition will depend on the particular query being run. If the query condition is satisfied, then the query results are output in step 340 in some convention manner. If the query condition is not satisfied, then it is determined in step 330 whether the current annotated object stored in memory space 216 is the last annotated object. This test determines whether there are any elements of the normal form which have not yet been created as complete objects. This test is performed by testing the highest level object, in the present example, the Design object. If the boolean annotation of the highest level object is F, then the current annotated object is the last one and the query results are output in step 345. As an example, a query may ask for the number of complete designs that are represented by a database object containing disjunctive information. In such a case, the query accumulator would contain a counter which would be incremented by one in step 320 each time a new element of the normal form is created. When the test of step 330 is YES, the query accumulator would contain the number of complete designs represented by the database object and the results would be output in step 345.

If the boolean annotation of the highest level object is T, then there are additional complete objects which have not yet been created. Control is passed to step 335 in which the next annotated object is created using the next function. The next function operates on the current annotated object stored in memory space 216.

As discussed above, in order to avoid the exponential space requirement of the prior art, the present invention queries one element of the normal form at a time. As represented in FIG. 2, the annotated objects are stored in memory space 216 and the completed objects which are elements of the normal form are stored in memory space 214. Each time a new annotated object is created, it is stored in memory space 216 and overwrites the previous annotated object. Similarly, each time a completed object, which is an element of the normal form, is created, it is stored in memory space 214 and overwrites the previous complete object.

Figure 5:
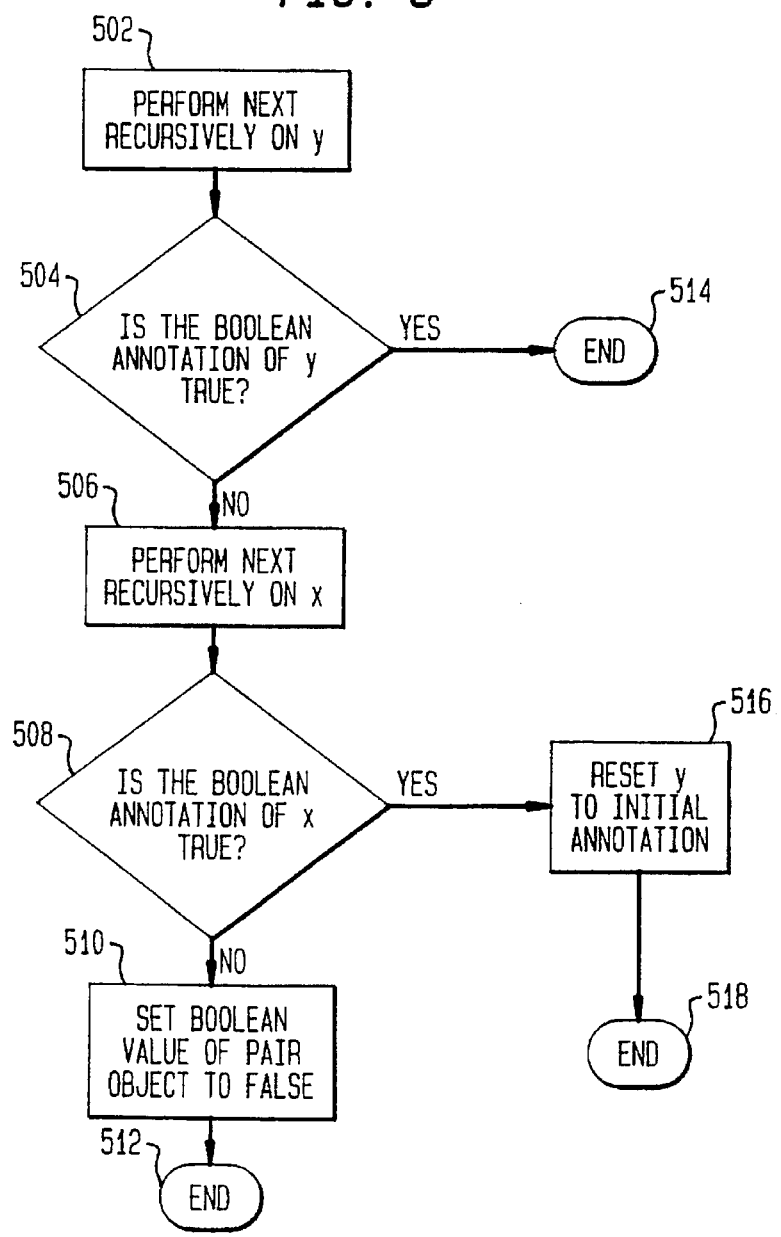
FIG. 5 is a flow diagram of the steps of the next function for pair type objects.
Figure 6:
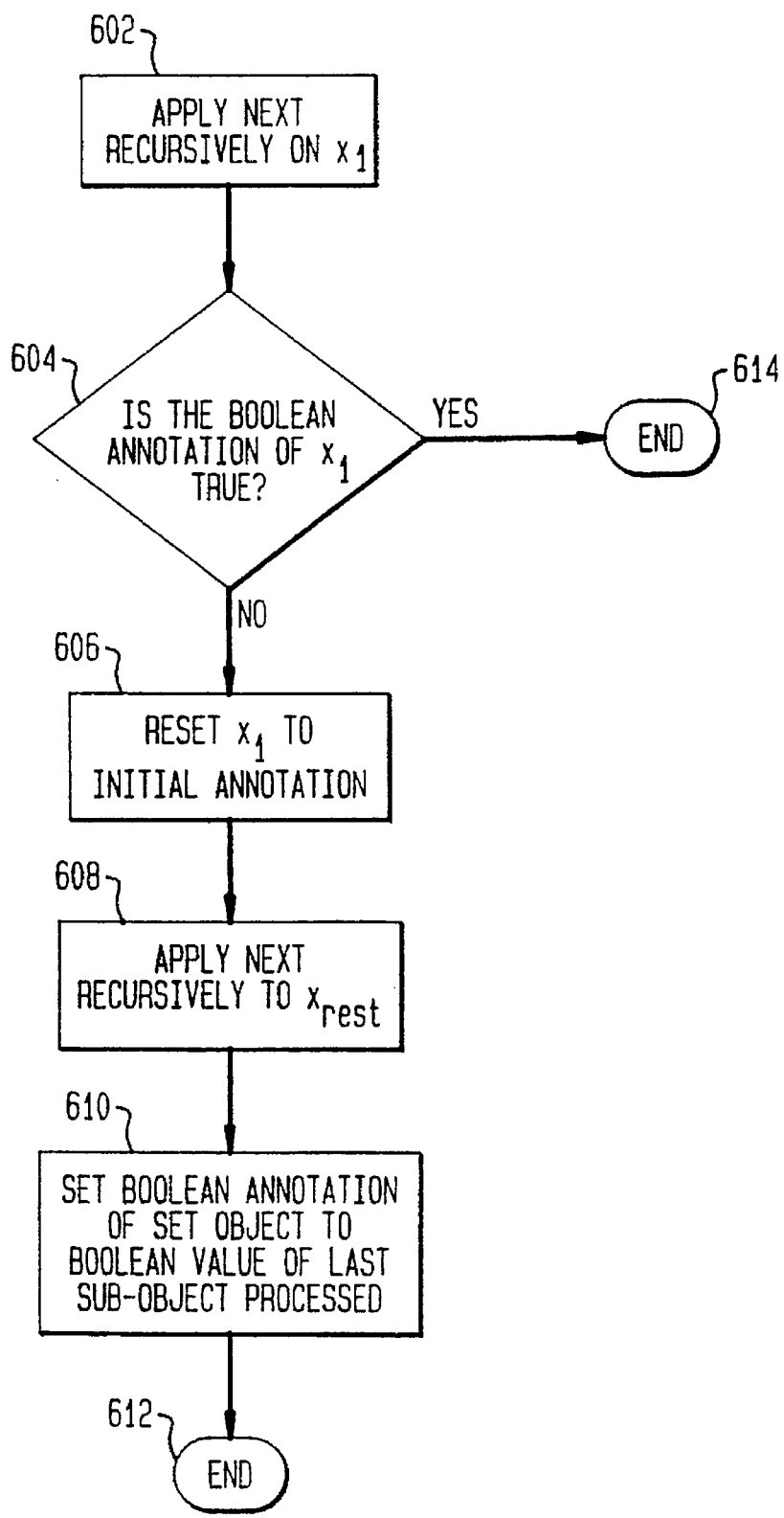
FIG. 6 is a flow diagram of the steps of the next function for set type objects.
Figure 7:
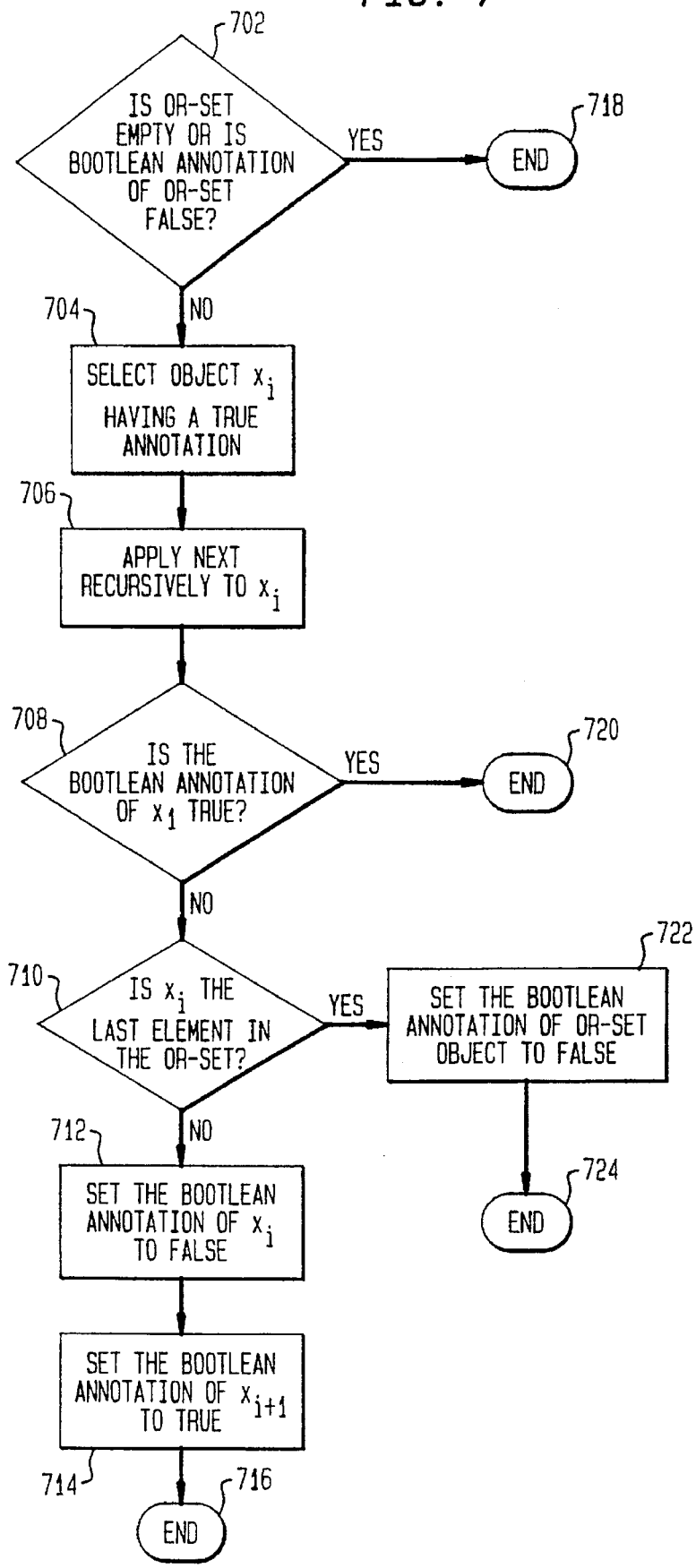
FIG. 7 is a flow diagram of the steps of the next function for or-set type objects.
Figure 8:
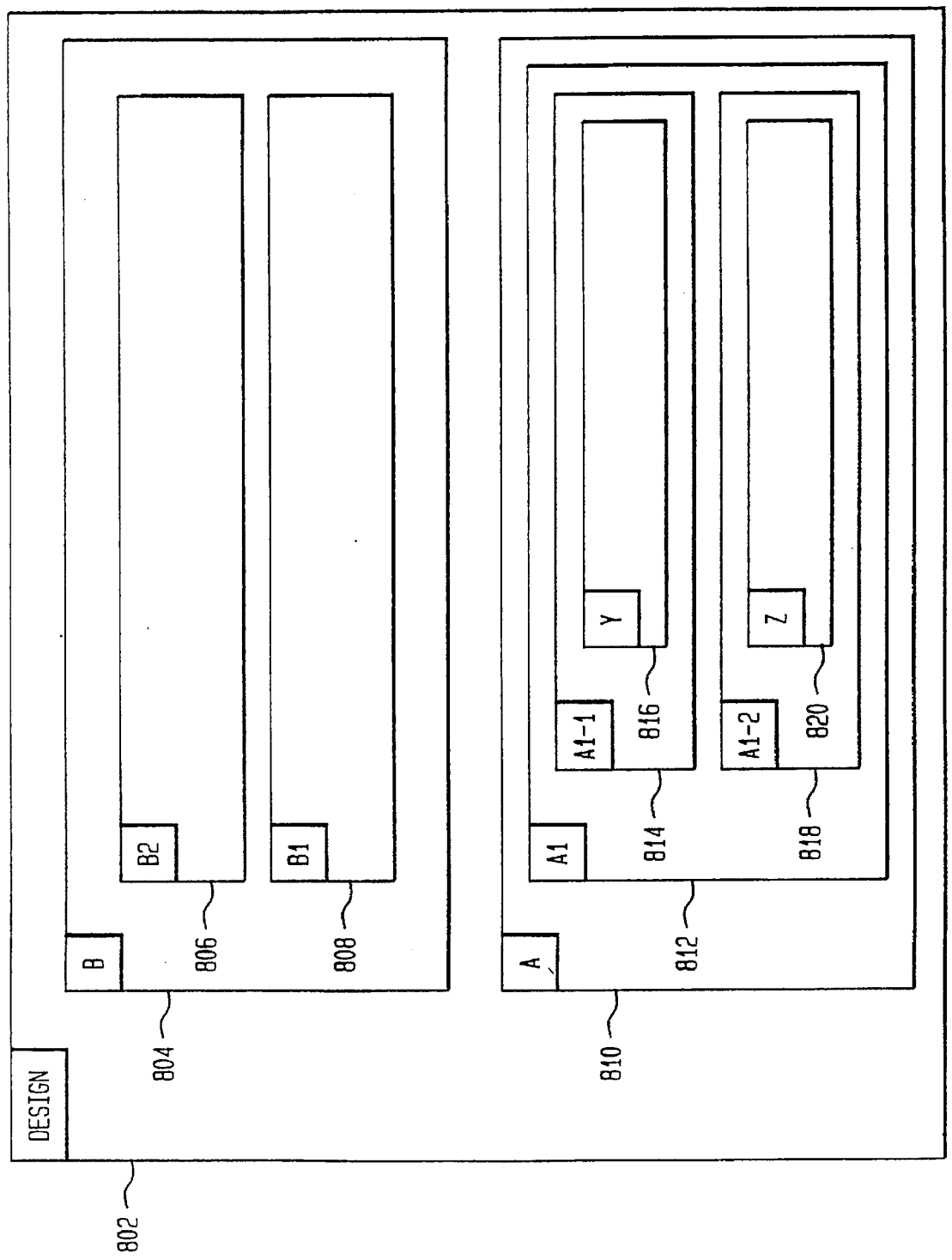
FIG. 8 illustrates the nesting of the recursive next function calls for an example annotated object.
Figure 9A:
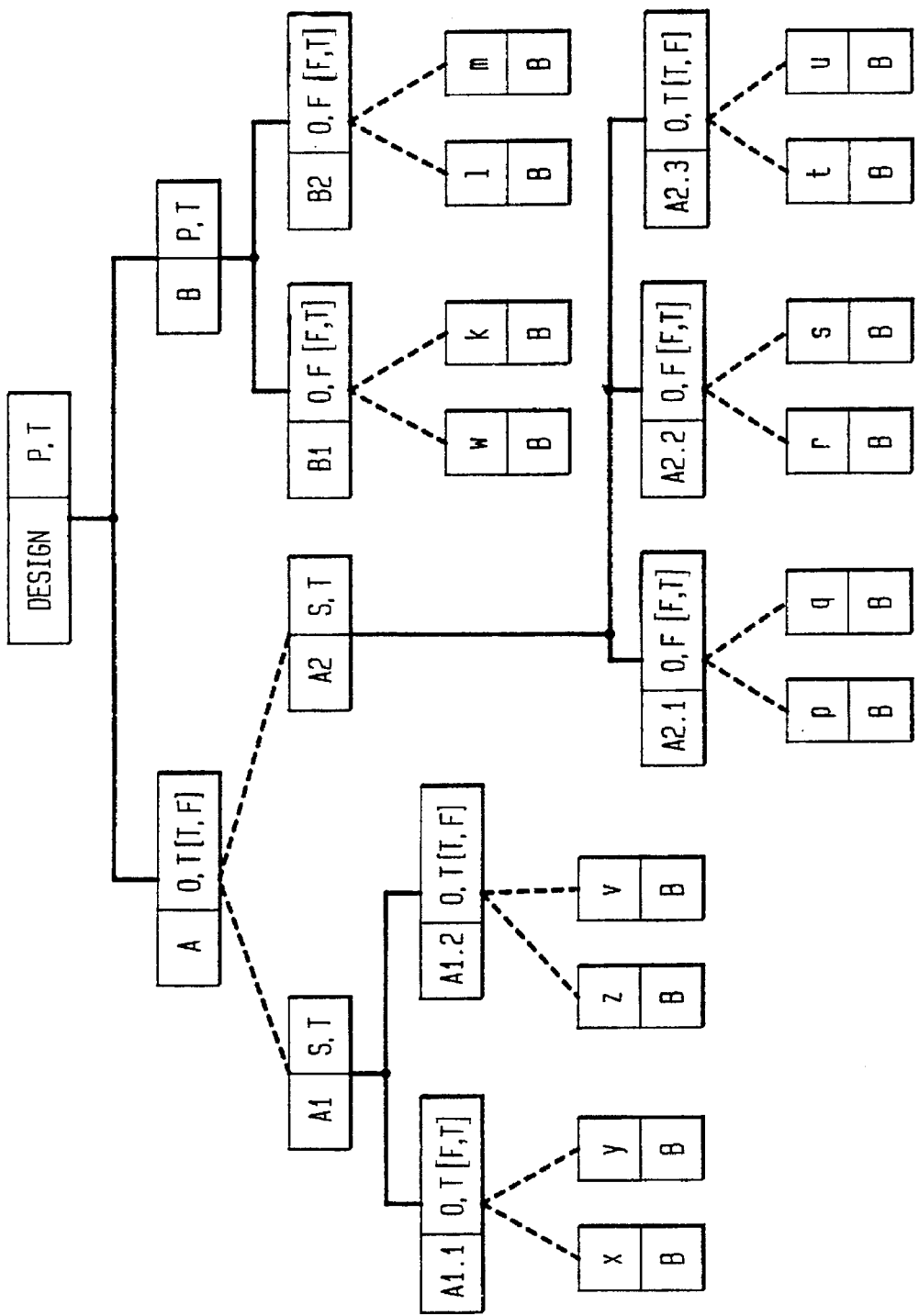
FIGS. 9A–F show starting, intermediate, and resulting annotated objects to illustrate the next function.
Figure 9B:
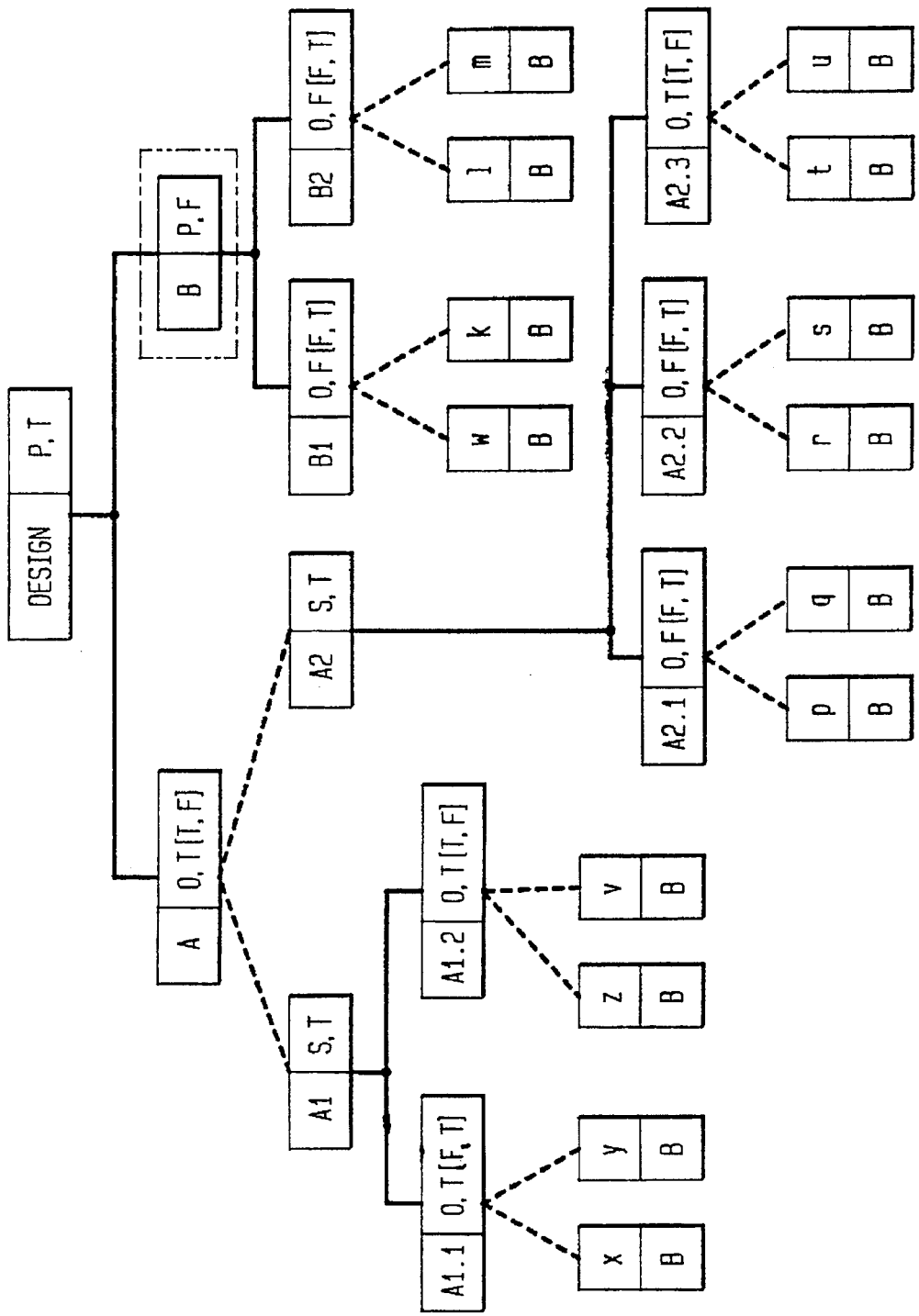
Figure 9C:
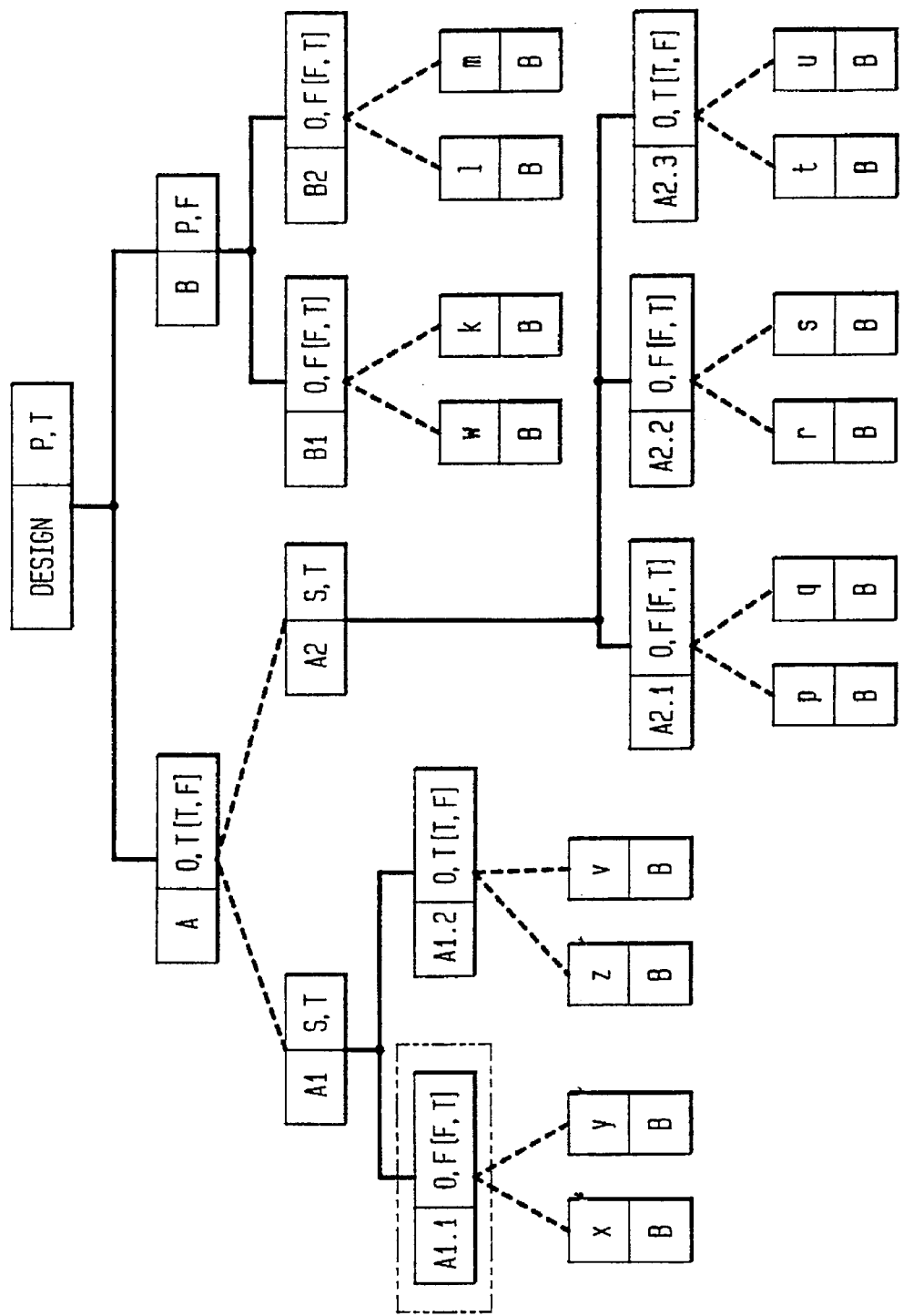
Figure 9D:
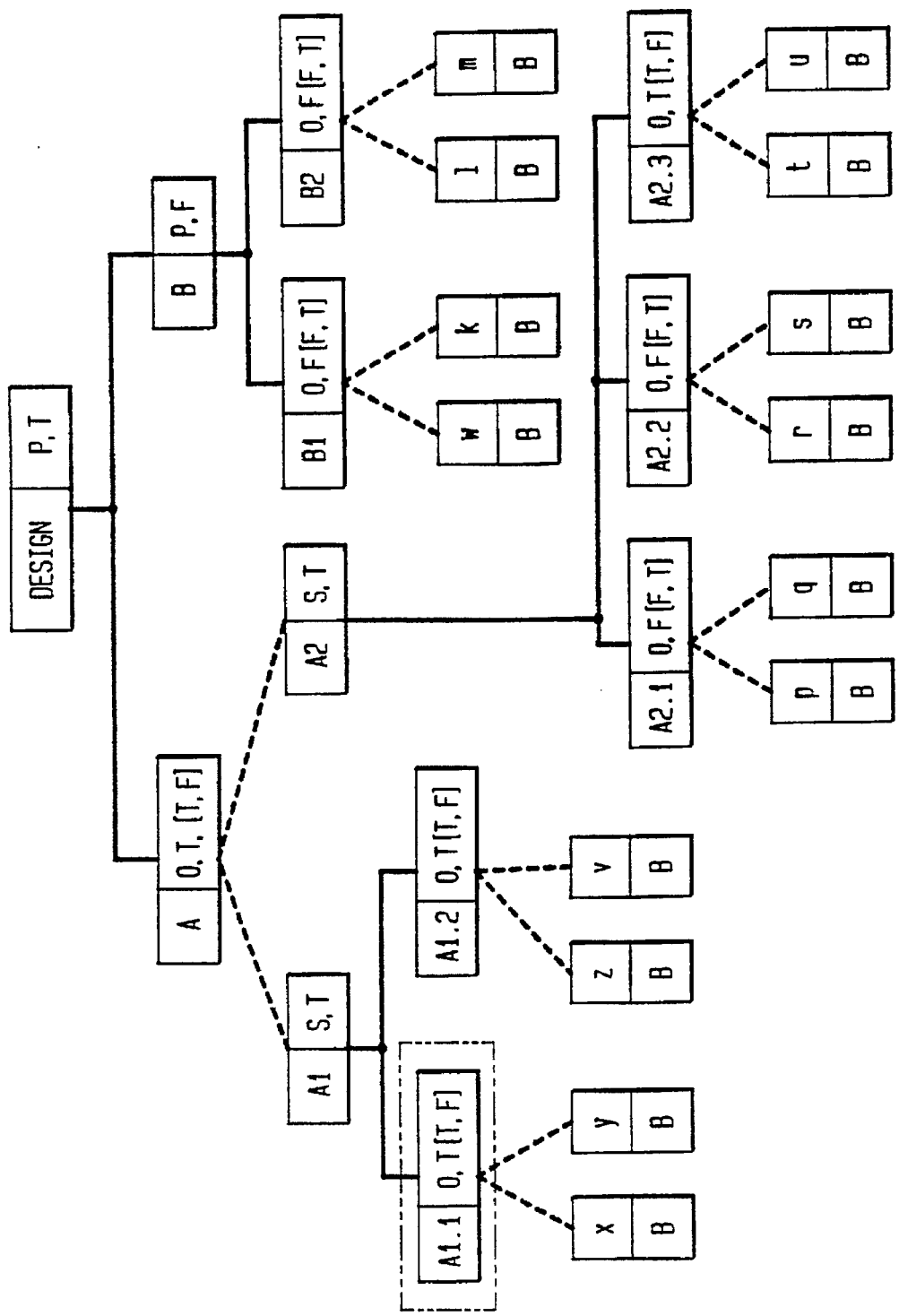
Figure 9E:
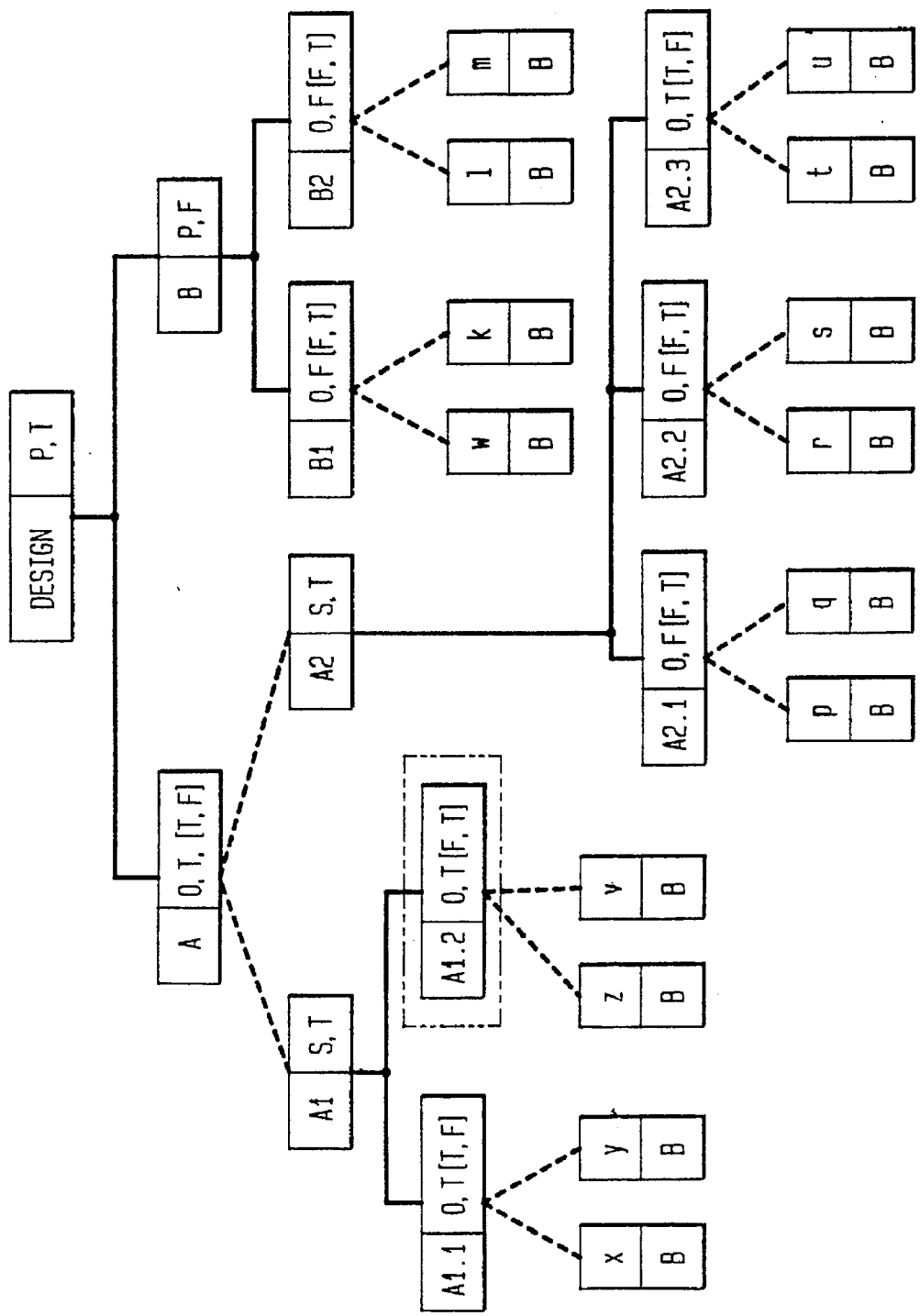
Figure 9F:
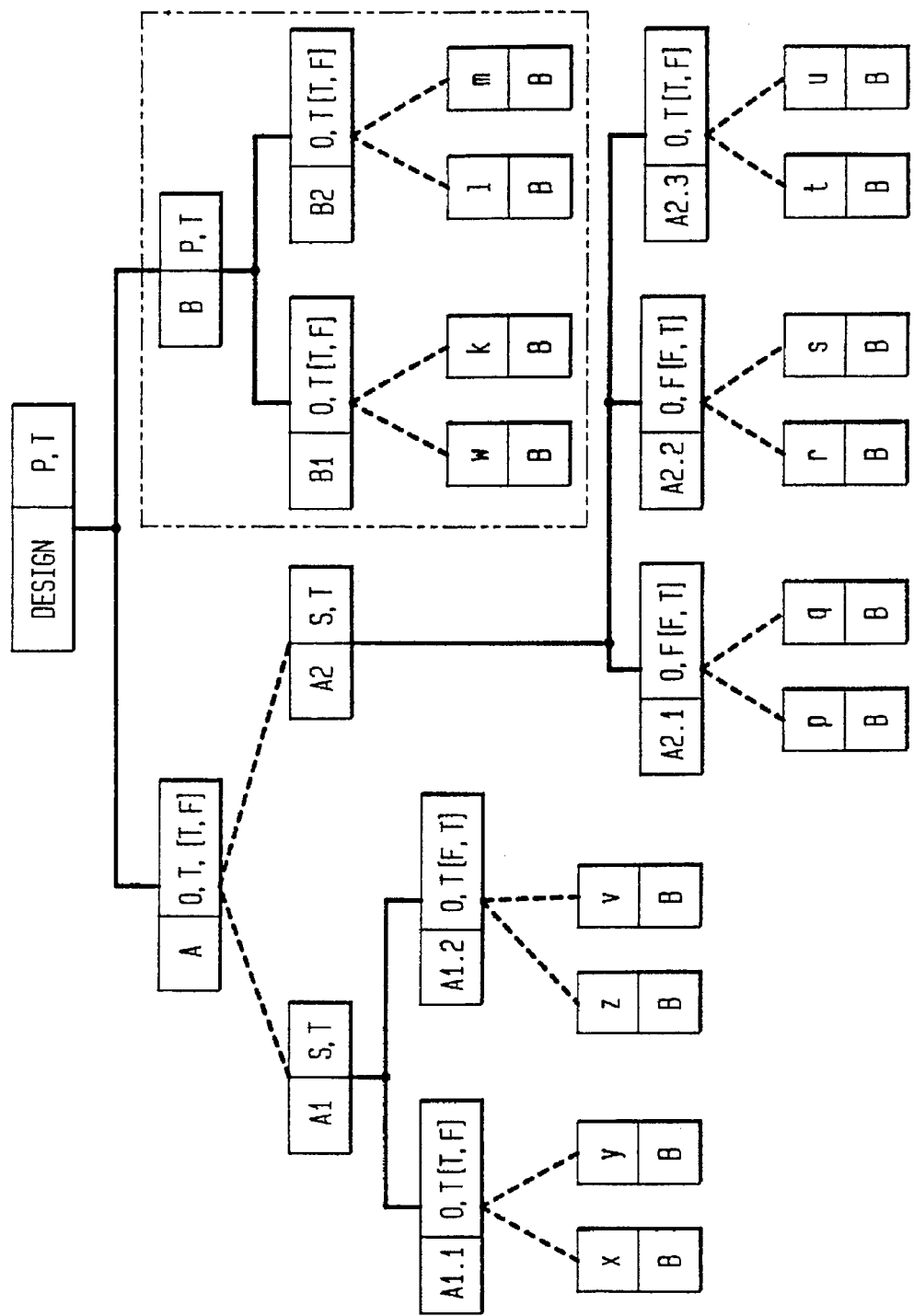

The next function algorithm will be described in conjunction with a specific example and with reference to FIGS. 5–9. FIG. 5 shows the algorithm for pair type objects. FIG. 6 shows the algorithm for set type objects. FIG. 7 shows the algorithm for or-set type objects. FIG. 9A shows a starting annotated object for the example. The resulting annotated object, after applying the next function to the annotated object shown in FIG. 9A, is shown in FIG. 9F. FIGS. 9B–9E show intermediate annotated objects which result from the recursive nature of the algorithm. In FIGS. 9B–9E, the portion of the annotated object which has changed from the immediately preceding annotated object is shown enclosed in broken lines. FIG. 8 illustrates the nesting of the recursive function calls.

The next function is applied to the entire DESIGN annotated object shown in FIG. 9A as follows. The next function is called to perform the algorithm on the DESIGN object. This is the top level of recursion and is shown as level 802 in FIG. 8. Since the DESIGN object shown in FIG. 9A is a pair object, the algorithm shown in FIG. 5 is applied.

Referring to FIG. 5, the general algorithm for a pair type object is as follows. In step 502 the next function is performed recursively on the y object of the pair. For purposes of this algorithm, the first object of the pair is identified as the x object and the second object of the pair is identified as the y object. After the next function is applied to an object, the boolean annotation of the object will indicate whether the object needs to be processed further. If the boolean annotation is T, then additional processing is necessary. If the boolean annotation is F, then no additional processing is necessary. In step 504 the y object's boolean annotation is examined. If the boolean annotation is T, then the function ends in step 514. If the y object's boolean annotation is F, then the next function is performed recursively on the x object in step 506. In step 508 it is determined whether the x object's boolean annotation is true. If it is, then object y, including all of y's sub-objects, is reset to its initial annotation in step 516, and the function ends in step 518. If the x object's boolean annotation is F, then the boolean annotation of the pair object is set to F in step 510, and the function ends in step 512.

Returning now to the specific example, in step 502, the next function is called recursively on object B. This is shown in FIG. 8 as level 804 of recursion. Since B is a pair object, the pair algorithm is applied again. In step 502, the next function is called recursively on the B2 object of the pair, shown as level 806 of recursion. Since B2 is an or-set, the or-set algorithm is applied.

Referring now to FIG. 7, the general algorithm for an or-set type object is as follows. In step 702 it is determined if the or-set is empty or if the or-set's boolean annotation is F. If either of these conditions is true, then the function ends in step 718. Otherwise, object $x_i$ of the or-set, which corresponds to the T value in the or-set object's boolean list annotation, is chosen in step 704. As an example, consider the or-set (a,b,c). If the or-set's boolean list annotation contained [F,T,F], then the second object, b, would be chosen as object $x_i$. Thus, the true value in the boolean list positionally represents which element to choose as object $x_i$. In step 706 the next function is applied recursively to $x_i$. In step 708 it is determined whether the $x_i$ object's boolean annotation is true. If it is, then the function ends in step 720. If it is false, then in step 710 it is determined whether $x_i$ is the last object of the or-set. If it is, then the boolean annotation of the or-set object is set to false in step 722 and the function ends in step 724. If $x_i$ is not the last object of the or-set, then the boolean value corresponding to object $x_i$ in the or-set object's boolean list annotation is set to F in step 712, and the boolean value corresponding to object $x_{i+1}$ in the or-set object's boolean list annotation is set to T in step 714. In effect, steps 712 and 714 shift the T boolean value in the or-set's boolean list annotation one position to the right. The function ends in step 716.

Returning now to the specific example, the test in step 702 is YES because the boolean annotation of the B2 or-set is F. The function ends in step 718 and the algorithm returns to processing the B object at recursion level 804.

The next function continues processing the B object at step 504. Since the boolean annotation of B2 is F, control passes to step 506 and next is performed recursively on B1 at recursion level 808. Since B1 is an or-set, the algorithm of FIG. 7 is performed and control passes to step 702. Since the boolean annotation of B1 is F, the function ends in step 718 and the algorithm returns to processing the B object at recursion level 804 at step 508. Since the boolean annotation of B1 is F, the B object's boolean annotation is set to F in step 510. The resulting intermediate annotated object is shown in FIG. 9B. The function ends in step 512 and the algorithm returns to processing the DESIGN object at the top recursion level 802 at step 504.

Since the boolean annotation of B is F, the condition of step 504 is NO, and control passes to step 506, where the next function is called recursively on object A. The algorithm enters recursion level 810 to process object A. Since A is an or-set, the algorithm of FIG. 7 is applied. In step 702 it is determined that the or-set is not empty and the or-set annotation is not F, so control passes to step 704. In step 704, A1 is chosen as $x_i$ since object A's boolean list annotation has a T in the first position, thus indicating that the first element of the or-set is to be chosen. In step 706, next is applied recursively to A1 at recursion level 812.

Since A1 is a set object (see footnote 1), the algorithm of FIG. 6 is applied. Referring now to FIG. 6, the general algorithm for a set type object is as follows. Regarding notation, the set [X] is considered to consists of the first object in the set, $x_1$, plus the rest of the objects in the set, $x_{rest}$. Thus, the set [X] is treated as $[X]=\{x_1\}\cup[x_{rest}]$. In step 602, the next function is applied recursively to object $x_1$. In step 604 it is determined whether the $x_1$ object's boolean annotation is T. If it is, then the function ends in step 614. If the boolean annotation is F, then the $x_1$ object, along with all of its sub-objects, is reset to its initial annotation in step 606. In step 608, the next function is applied recursively to $X_{rest}$. In step 610, the boolean annotation of the set object is set to the value of the boolean annotation of the last object of the set which was processed. The function ends in step 612.

Returning to the specific example, in step 602, next is applied recursively to object A1.1 at recursion level 814. Since A1.1 is an or-set, the algorithm of FIG. 7 is applied. The test of step 702 is NO, and the object y is selected in step 704. In step 706, the next function is applied recursively to object y at recursion level 816. y is a base type. If the next function is applied to a base type, there is no change to the annotated object. Thus there is no processing necessary, and the function returns to recursion level 814 to continue processing the A1.1 object. The test of step 708 is NO because, as described above, the boolean annotation of a base object is always assumed to be F. Since y is the last element of the or-set, the test of step 710 is YES and control passes to step 722. In step 722, the boolean annotation of object A1.1 is set to F. The resulting intermediate annotated object is shown in FIG. 9C. The function ends in step 724, and the algorithm returns to recursion level 812 to continue processing the A1 object.

Since the boolean annotation of object A1.1 is F, the test in step 604 is NO, and A1.1 is reset to its initial annotation in step 606. The resulting intermediate annotated object is shown in FIG. 9D. In step 608, next is applied recursively to A1.2, which is $x_{rest}$, at recursion level 818.

Since A1.2 is an or-set, the algorithm of FIG. 7 is applied. The test of step 702 is NO, and object z is selected in step 704. In step 706, the next function is applied recursively to object z at recursion level 820. Since z is a base type, there is no processing necessary, and the function returns to recursion level 818 to continue processing the A1.2 object. The test of step 708 is NO, and control passes to step 710. Since z is not the last object in the or-set, the boolean value in the A1.2 object's boolean list annotation corresponding to z is set to F in step 712, and the boolean value in the A1.2 object's boolean list annotation corresponding to v is set to T in step 714. In effect, steps 712 and 714 shift the T value in A1.2's boolean list annotation one position to the right. The resulting intermediate annotated object is shown in FIG. 9E. The function ends in step 716 and the algorithm returns to recursion level 812 to continue processing object A1.

In step 610, the boolean annotation of A1 remains set to T, since the boolean annotation of the last sub-object processed, A1.2, has a boolean annotation of T. The function ends in step 612 and the algorithm returns to recursion level 810 to continue processing object A.

In step 708 it is determined that A1 has a true annotation. The function ends in step 720 and the algorithm returns to the top recursion level 802 to continue processing the DESIGN object.

In step 508 it is determined that A has a true annotation. In step 516, object B, including all of its sub-objects, is reset to its initial annotation. The resulting annotated object is shown in FIG. 9F. The function ends in step 518. Since this was the top recursion level, the next function is finished processing the DESIGN object, and FIG. 9F represents the final annotated object which results from applying the next function to the annotated object of FIG. 9A.

Referring to FIG. 3, upon completion of step 335, control is passed to step 315, and the algorithm continues as described above.

In an alternate embodiment of the invention, step 310 is modified so that a pre-defined annotated object may be input and used as the starting point for the main loop (steps 315 through 335) of the algorithm. This is illustrated in FIG. 3 by annotated object 350. In addition, the results 340 which are output following a YES condition in steps 325, and the results 345 which are output following a YES condition in step 330, may contain the current annotated object which is stored in memory space 216. Thus, in this alternate embodiment, the invention allows for a pre-defined annotated object to be used as input, and for the results of the algorithm to include the current annotated object as an output. These aspects allow for novel query techniques, as described below.

One technique made possible by the present invention is normalization with time constraints. The time needed to normalize a large database may be very long. Thus, iterating over the entire normal form may be impractical. Using the above techniques, it is possible to start at the initial annotated object in step 310, and iterate for a pre-defined time period. Thus, one of the conditions of step 325 would be whether the pre-defined time period has expired. If it has, then the results 340 would include the results of the particular query being run, along with the last annotated object 355 which was processed. The user may then examine the query results and determine if they are satisfactory. If so, no further processing is necessary. If the user would like to continue processing the query, the last annotated object 355 processed which was output with the results 340, is used as an input annotated object 350 for further processing. The algorithm then continues processing from step 315 using the last processed annotated object from the previous iteration. This allows for querying a disjunctive database over its entire normal form, while allowing the processing to be interrupted at certain intervals so that the intermediate results can be examined.

In addition, a random annotation could be generated and used as the input annotated object 350. This would be useful for optimization queries over large normal forms. In such a case, it may not be feasible to calculate the entire normal form. In addition, the time limit approach may not be sufficient, because optimal values may be far from any given starting annotation in terms of the number of times the next function must be applied. The solution to this problem is to generate a number of random annotations and run the optimization query starting from each random annotation for a predetermined time period.

In another embodiment, another object type is defined for use in annotating the objects. This new type is Fake Base (FB). This allows for additional user control as follows. Consider the DESIGN object of FIG. 1 with its initial annotation shown in FIG. 4A. It is possible that a user may want to run a query on the DESIGN object, but the user is only interested in optimizing over the A object, including its sub-objects. In such a case, the user is not interested in the B object or its sub-objects. The use of the fake base type allows the user to specify this by creating an annotated object in which the B object is annotated with the type FB. This annotated object is used as the input 350 to the algorithm. The pick function is modified to treat FB annotated objects as base objects, disregarding their complex structure. The next function also treats these fake base types as base types, and thus will not create all the elements of the normal form represented by these objects. In the example above, where B is annotated as FB, the query can still run correctly because it does not consider the B object's complex structure.

Functional Description

The following is an additional description of certain aspects of the present invention using a functional language specification. For further information on functional language specification see, C. Reade, *Elements of Functional Programming*, Addison-Wesley, 1989. The same algorithms which were described above in terms of flow diagrams, are described below using a functional language specification. Note that the invention has been fully described above. What follows is an alternate description using a different type of descriptive language. This section is included for pedagogical reasons and is not intended to limit the above description in any way.

Definition of Annotated Object

For each object type t, there is a new annotated type A(t) and the initial translation t→A(t).

Type K (kind) has four possible values: B (base), P (pair), S (set), and O (or-set). [t] denotes the type of lists of type t. For each type t, an annotated type A(t) is created as follows:

$A(b) = K \times b$ if $b$ is a base type
$A(s \times t) = K \times \text{bool} \times (A(s) \times A(t))$
$A(\{t\}) = K \times \text{bool} \times [A(t)]$
$A(<t>) = K \times \text{bool} \times [A(t) \times \text{bool}]$ The first boolean value in these translations is set to true if there are still entries represented by the object that have not been looked at. For or-sets, the boolean component inside lists is used for indicating the element that is currently used as the choice given by that or-set. In all algorithms only one entry in such a list will have the true boolean component.

Initial Function initial:t→A(t)

produces the initial annotation of an object. The definition of initial is given in FIG. 10.

Pick Function pick:A(t)→sk(t)

produces an element of the normal form given by an annotation. sk(t) is t from which all or-set brackets are removed. If an object has type t, elements of its normal form have type sk(t). The definition of pick is given in FIG. 11. In FIG. 11, void means a special object used to indicate the end of the process of going over the normal form. P1–P5 gives a version of pick in which void is not propagated to the top level. Such propagation can be done to detect inconsistencies represented by empty or-sets.

End Function end: A(t)→bool returns true if and only if all possibilities represented by its argument have been exhausted. This function always returns true on (B,x). On any other annotated object, x is of the form (k,c,v), where:

k is kind;
c is condition; and
v is value.

For such x, end (x)←c.

Reset Function rest:A(t)→A(t)

disregards the annotation of an object and restores the initial one. This definition repeats the initial function.

Next Function

The algorithm for the next function is recursive. In the definition of the next function, for any list $X=[x_1, \ldots, x_n]$ $X_{oi}$ stands for $[x_1, \ldots, x_{i-1}]$ and $X_{1i}$ denotes $[x_{i+1}, \ldots, x_n]$. These sets may be empty. The notations :: and @ are used for consing and appending. That is, a::x puts a as the new head before the list x, and x@y appends y to the end of x. The next algorithm is shown in FIG. 12.

The following algorithm, which defines a function norm, can be used to query a disjunctive database:

```
norm (cond, init, update, out) (o)
    acc:=init;
    ao:=initial o;
    last:=end ao;
    while not (cond(pick ao) or last)
        do
            acc:=update(pick ao, acc);
            ao:=next ao;
            last:=end ao
        end;
    return out((pick ao, last), acc, ao)
```

The output value is accumulated in acc; cond is used to break the loop if the condition is satisfied; last indicates if all possibilities have been looked at; and out forms the output.

As noted at the beginning of this section, the algorithms of the present invention have been fully described in a conventional manner in conjunction with the flow diagrams of FIGS. 3 and 5–7, and the detailed description associated with those figures. The functional language description is given only as an alternate description of certain aspects of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A method for operation of a computer system for querying a database containing disjunctive information comprising the steps in the sequence set forth of:

producing a first element of the normal form of the database;

applying a query against the first element of the normal form;

producing a second element of the normal form of the database; and applying the query against the second element of the normal form.

2. The method of claim 1 wherein:

said step of producing a first element of the normal form of the database further comprises the steps of:

producing an initial annotated object, and picking the first element of the normal form using the initial annotated object;

said step of producing a second element of the normal form of the database further comprises the steps of:

producing a next annotated object using the initial annotated object, and picking the second element of the normal form using the next annotated object.

3. The method of claim 1 further comprising the steps of:

storing the first element of the normal form in a memory space; and replacing the first element of the normal form with the second element of the normal form in the memory space.

4. The method of claim 2 further comprising the steps of:

storing the initial annotated object in a memory space; and replacing the initial annotated object with the next annotated object in the memory space.

5. The method of claim 1 wherein:

said step of producing a first element of the normal form of the database further comprises the steps of:
producing a random annotated object, and
picking the first element of the normal form using the random annotated object;

said step of producing a second element of the normal form of the database further comprises the steps of:
producing a next annotated object using the random annotated object, and
picking the second element of the normal form using the next annotated object.

6. A method for operation of a computer system for querying a database containing disjunctive information comprising the steps of:

(a) producing a unique element of the normal form of the database;

(b) applying a query to the unique element of the normal form; and (c) conditionally repeating steps (a) and (b) in response to step (b).

7. The method of claim 6 wherein the first iteration of step (a) further comprises the steps of:

receiving as input a starting annotated object; and picking a unique element of the normal form using the starting annotated object.

8. The method of claim 7 wherein the received annotated object contains user specified type indicia, wherein step (a) further comprises the step of:

excluding the production of certain unique elements of the normal form of the database in response to the user specified type indicia.

9. A method for operation of a computer system for processing a query on a database containing disjunctive information, the method comprising the steps of:

(a) producing a unique element of the normal form of the database;

(b) applying a query to the element of the normal form produced in step (a); and (c) repeating steps (a) and (b) until a stop condition has been satisfied.

10. The method of claim 9 wherein said stop condition is a predetermined time limit, said method further comprising the step of:

terminating the processing and outputting results when the predetermined time limit has been reached.

11. The method of claim 9 wherein:

the first iteration of step (a) further comprises the steps of:
creating an initial annotated object, and
picking a complete object using the annotated object;

each iteration of step (a) after the first iteration further comprises the steps of:
creating a next annotated object, and
picking a complete object using the next annotated object.

12. The method of claim 11 further comprising the step of:

terminating the processing and outputting an annotated object when the stop condition is satisfied.

13. The method of claim 12 further comprising the step of:

continuing the processing using the outputted annotated object.

14. The method of claim 9 wherein the first iteration of step (a) further comprises the steps of:

receiving a user defined annotated object, and picking a complete object using the annotated object.

15. The method of claim 9 wherein the first iteration of step (a) further comprises the steps of:

receiving a random annotated object; and picking a complete object using the random annotated object.

16. An apparatus for querying a database containing disjunctive information comprising:

a computer processor;

a memory unit connected to the computer processor;

an annotated object stored in the memory unit;

means responsive to the annotated object for creating an element of the normal form of the database; and query means for querying the element of the normal form.

17. The apparatus of claim 16 further comprising:

means for producing a next annotated object from a current annotated object.

18. The apparatus of claim 17 wherein said means for producing a next annotated object from a current annotated object further comprises:

means for replacing the current annotated object with the next annotated object in the memory unit.

19. The apparatus of claim 17 wherein said means responsive to the annotated object for creating an element of the normal form of the database further comprises:

means for storing each created element of the normal form in the same memory space in the memory unit.

20. The apparatus of claim 16 further comprising:

means for producing a random annotated object.

21. A method for operation of a computer system for generating elements of the normal form of a disjunctive database, the method comprising the steps of:

creating a first annotated object which represents a first unique element of the normal form;

storing the first annotated object in a first memory space;

creating the first element of the normal form using the first annotated object; and storing the first element of the normal form in a second memory space.

22. The method of claim 21 further comprising the step of:

applying a query to the first element of the normal form.

23. The method of claim 21 further comprising the steps of:

creating a second annotated object which represents a second unique element of the normal form;

storing the second annotated object in the first memory space;

creating the second element of the normal form using the second annotated object; and storing the second element of the normal form in the second memory space.

24. The method of claim 23 further comprising the step of:

applying a query to the second element of the normal form.

25. The method of claim 23 further comprising the steps of:

applying a query to the first element of the normal form; and applying a query to the second element of the normal form.

* * * * *